United States Patent [19]
Baker et al.

[11] 3,879,421
[45] Apr. 22, 1975

[54] CERTAIN METHYLENEDIOXYPHENYL PROPYNES

[75] Inventors: Don R. Baker, Orinda; Eugene G. Teach, El Cerrito, both of Calif.

[73] Assignee: Stauffer Chemical Company, Westport, Conn.

[22] Filed: Aug. 13, 1973

[21] Appl. No.: 387,885

Related U.S. Application Data

[60] Continuation-in-part of Ser. No. 218,511, Jan. 17, 1972, abandoned, which is a division of Ser. No. 884,685, Dec. 12, 1969, abandoned.

[52] U.S. Cl. .............................................. 260/340.5
[51] Int. Cl. .............................................. C07d 13/10
[58] Field of Search .................... 260/340.5; 424/282

[56] References Cited
UNITED STATES PATENTS

| | | | |
|---|---|---|---|
| 2,951,850 | 9/1960 | Hartle et al. | 424/282 |
| 3,423,428 | 1/1969 | Fellig et al. | 260/340.5 |
| 3,795,740 | 3/1974 | Baker et al. | 260/340.5 |

*Primary Examiner*—V. D. Turner
*Attorney, Agent, or Firm*—Daniel C. Block

[57] ABSTRACT

A compostion of matter is described herein which is used as a synergist for carbamate insecticides and methods of use. The composition may be defined by the following generic formula:

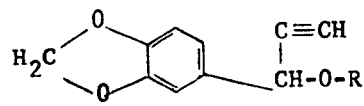

wherein R can be selected from radicals consisting of N-methyl carbamoyl, N-phenyl carbamoyl and N-p-chlorophenyl carbamoyl.

4 Claims, No Drawings

CERTAIN METHYLENEDIOXYPHENYL PROPYNES

CROSS REFERENCE TO RELATED APPLICATIONS

This application is a continuation in part of application Ser. No. 218,511 filed Jan. 17, 1972 now abandoned, which is a division of application Ser. No. 884,685 filed Dec. 12, 1969, now abandoned.

BACKGROUND OF THE INVENTION

Among the many insecticidal compounds, the carbamates have reached a relatively high degree of commercial success. The carbamates are immediately toxic to a large number of insect pests at different concentrations varying with the resistance of the insects mentioned. Some of the compounds are described and claimed in U.S. Pat. No. 2,903,478 and sold under the tradename SEVIN.

The endeavor to extend the usefulness of the carbamates by increasing their effectiveness and lowering their cost has led to extensive studies on another class of insecticidal material customarily referred to as synergists. Among the many synergists employed, the alkyl oxides, specifically, piperonyl butoxide, have been widely used. These compounds are described in U.S. Pat. Nos. 2,485,681 and 2,550,737.

While these compositions enhance the usefulness of the carbamates, they do not measure up to the low cost that is desirable along with increased effectiveness.

BRIEF DESCRIPTION OF THE INVENTION

It has been discovered that the carbamate compositions having insecticidal activity can be greatly increased by using a synergist, therefore, having the following formula:

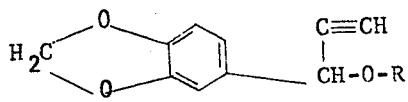

in which R is a radical selected from the group consisting of N-methyl carbamoyl, N-phenyl carbamoyl and N-p-chlorophenyl carbamoyl.

DETAILED DESCRIPTION OF THE INVENTION

In the practive of the present invention, the synergistic compounds of the present invention are manufactured by reacting 1-propyne alcohol substituted at 3rd position with certain vinyl ethers, acid chlorides or isocyanates. After the end products are achieved, they are isolated and purified and admixed with the insecticidal compositions. The amount of synergist admixed therewith can range from between about 1 to 0.1 to about 1 to 10 parts carbamates to synergist composition. After the carbamates and synergists are mixed together, they are applied to a habitat in a conventional manner as indicated for use with the carbamates.

In order to illustrate the merits of the present invention, the following examples are provided:

EXAMPLE I

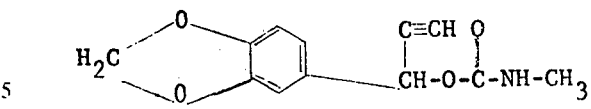

21 grams (0.12 moles) of 3(3',4'-methylenedioxyphenyl) propyne-3-ol was dissolved in 100 ml. of acetone containing about 0.1 gram of triethylene diamine and 0.1 g. of dibutyl tin dilaurate. Then, 8.5 g. of methyl isocyanate was added. The mixture was heated at reflux temperature for two hours, colled and the acetone removed by evaporation under vacuum to give 27.5 g. of a solid product having a m.p. of between 75.5° and 77°C.

EXAMPLE II

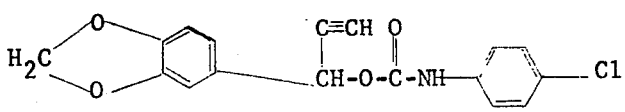

A mixture was formed containing 17.6 grams of 3-(3',4'-methylenedioxyphenyl)-propyne-3-ol (0.10M), 15.4 g. of p-chlorophenylisocyanate, 50 ml. ether, 1 drop dibutyl tin dilaurate and 1 drop triethylamine. The reaction went to completion exothermically. The mixture was allowed to stand for 16 hours, wherein a small amount of solid was filtered off and discarded. The filtrate was evaporated to yield 27.1 gm. of a solid product having a m.p. between 76° and 78°C.

EXAMPLE III

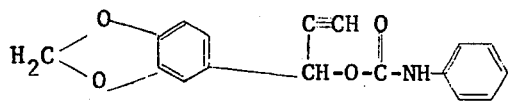

A mixture was formed containing 5.9 grams of 3-(3',4'-methylenedioxyphenyl)-propyne-3-ol (0.033 M), 50 ml. of ether, 4.0 g. of phenyl isocyanate and 1 drop of dibutyl tin dilaurate. The reaction went to completion slightly exothermically (to about 25°C). The mixture was allowed to stand overnight, wherein a small amount of solid was filtered off and discarded. The filtrate was concentrated in a vacuum to yield 15.6 g. of an oil. $n_D^{30}$ 1.5687.

INSECTICIDAL EVALUATION

The following procedure was used to test houseflies. A stock solution containing 100 µg/ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 µg per Petri dish to that at which 50 percent mortality was attained. The Petri dishes were placed in a circular cardboard cage, closed on the bottom with cellophane and covered on top with cloth netting. Twenty-five female houseflies were introduced into the cage and the percent mortality was recorded after 48 hours. The LD-50 values are expressed in terms of µg per 25 female houseflies. The results of these insecticidal evaluation tests are given in Table I.

TABLE I

| | Average LD$_{50}$ Values | | |
| | μg/25 Female Houseflies | | |
| Coded Compound | Carbaryl* | Carbaryl* + Piperonyl Butoxide 1:5 ratio | Carbaryl* + Coded Compound 1:5 ratio |
| --- | --- | --- | --- |
| Example I | 100 | 22 | 2.9 |
| Example II | 100 | 22 | 12.0 |
| Example III | 100 | 22 | 5.0 |

* Sold under tradename SEVIN

What is claimed is:

1. A compound having the formula

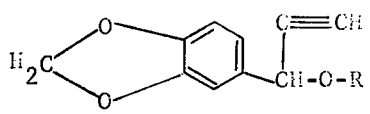

wherein R is selected from the group consisting of N-methyl carbamoyl, N-phenyl carbamoyl and N-p-chlorophenyl carbamoyl.

2. The compound of claim 1 wherein R is N-methyl carbamoyl.

3. The compound of claim 1 wherein R is N-phenyl carbamoyl.

4. The compound of claim 1 wherein R is N-p-chlorophenyl carbamoyl.

* * * * *